Apr. 10, 1923.
J. F. O'CONNOR
1,451,104
FRICTION SHOCK ABSORBING MECHANISM
Original Filed Oct. 17, 1921    2 sheets-sheet 1
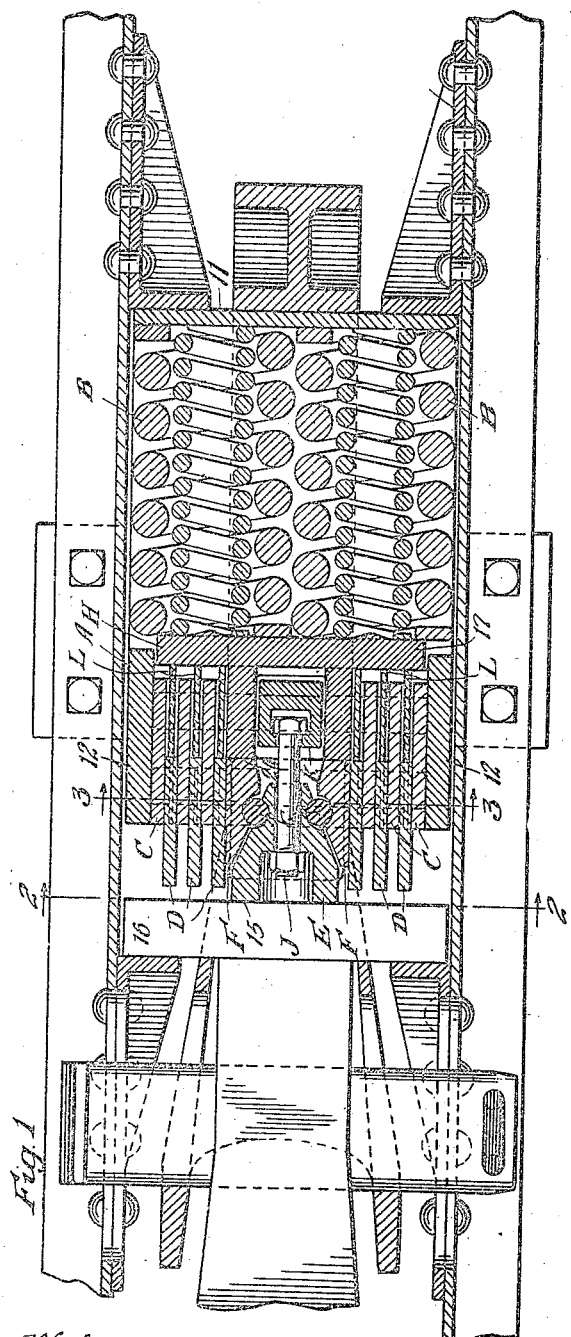
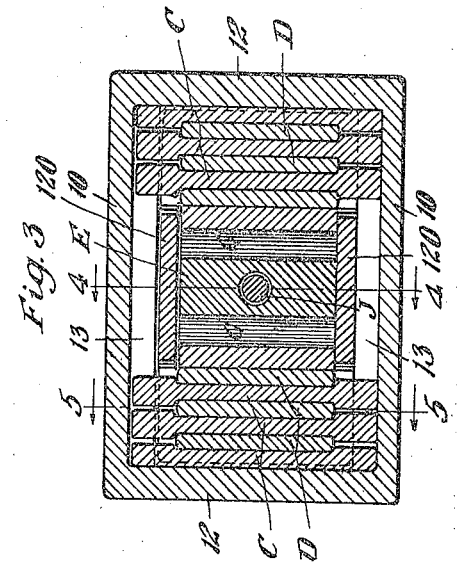
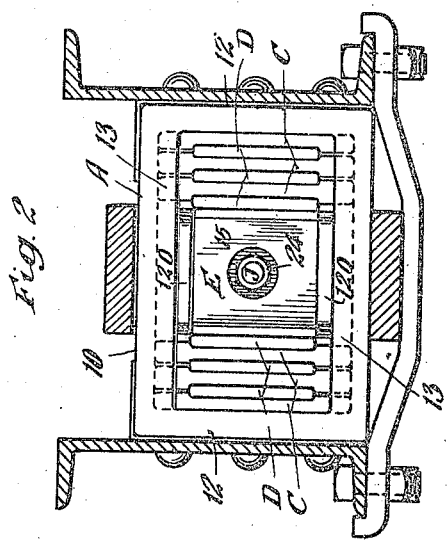
Witnesses
Wm. Geiger
Inventor
John F. O'Connor
By Geo. I. Haight
His Atty Apr. 10, 1923.                                                                  1,451,104
J. F. O'CONNOR
FRICTION SHOCK ABSORBING MECHANISM
Original Filed Oct. 17, 1921     2 sheets-sheet 2
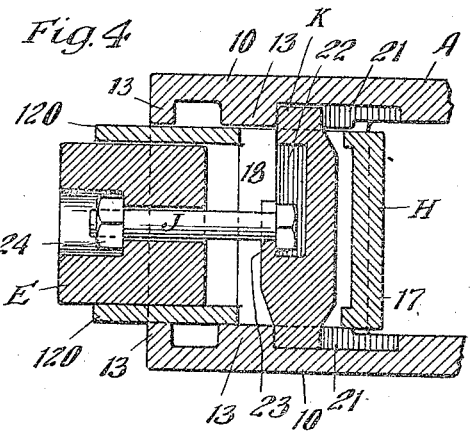
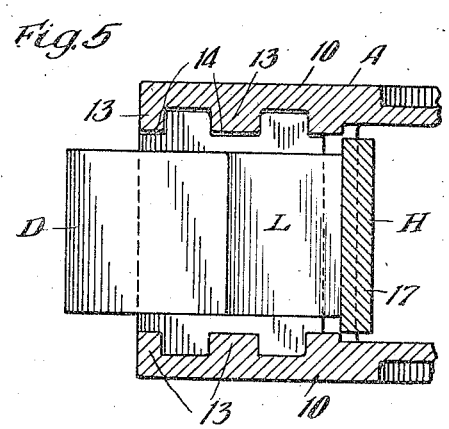
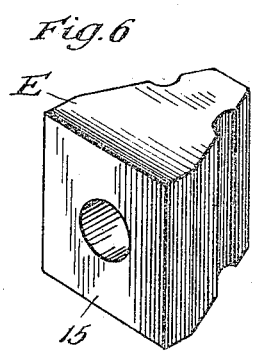
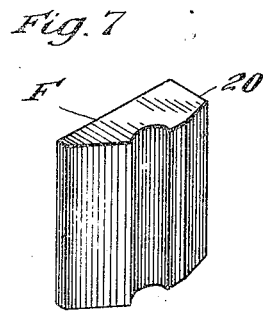
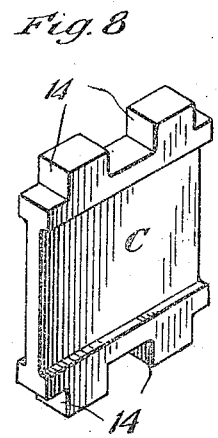
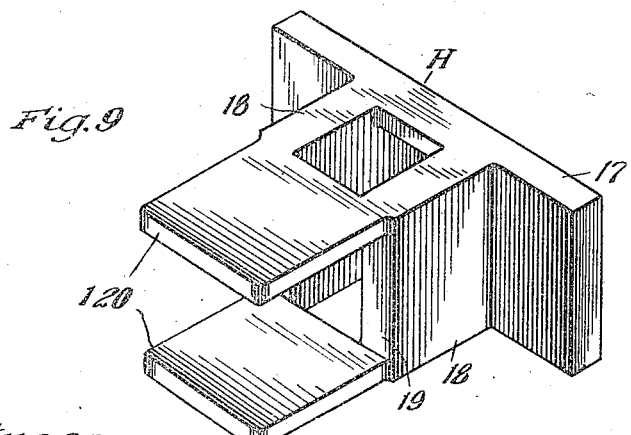
Witnesses
Wm. Geiger
Inventor
John F. O'Connor
By Geo. I. Haight
His Atty.

Patented Apr. 10, 1923.

1,451,104

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed October 17, 1921, Serial No. 508,336. Renewed February 16, 1923.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide a friction shock absorbing mechanism especially adapted for railway draft riggings wherein are obtained high capacity, certain release, large frictional wearing areas, low pressure per unit of frictional area, and novel and efficient means for effecting return of certain of the parts to normal position.

In the drawing forming a part of this specification, Figure 1 is a horizontal, longitudinal sectional view of a portion of a railway draft rigging showing my improvements in connection therewith. Fig. 2 is a vertical transverse sectional view corresponding to the line 2—2 of Fig. 1. Fig. 3 is a vertical sectional view of the shock absorbing mechanism proper, upon an enlarged scale, corresponding to the section line 3—3, of Fig. 1. Figs. 4 and 5 are broken longitudinal sectional views corresponding to the lines 4—4 and 5—5 of Fig. 3. And Figs. 6, 7, 8 and 9 are detail perspectives of a wedge, a wedge-shoe, a stationary friction plate, and a spring follower, respectively, employed in my construction.

In said drawings, the arrangement of center sills, stop lugs, drawbar, yoke and front follower is the same as that commonly employed, the details of which need not be described. The improved shock absorbing mechanism proper, as shown, comprises a casting A which combines the friction shell proper and spring cage; twin arranged main springs B—B; a series of relatively stationary friction plates C; a series of relatively movable friction plates D; a wedge E; a pair of wedge-friction-shoes F—F; a pair of anti-friction rollers G—G; a spring follower H; a retainer bolt J; an anchoring bar K and a series of pressure-transmitting elements L—L.

The casting A, which may be variously termed a follower-acting-member, a column-load-sustaining member or shell, is of generally rectangular form having upper and lower walls 10—10, integrally united at the rear of the casting by a vertical transverse wall 11 which cooperates with the rear stop lugs and side walls 12—12. The latter are relatively short so as to leave the major portion of each side of the casting open to permit of the insertion and removal of the springs and certain other parts.

The shell portion proper of the casting A is at the forward or outer end, as shown, and the same is provided with upper and lower sets of transversely extending ribs 13—13 by means of which the stationary friction plates C are adapted to be anchored to the casting against longitudinal movement although left freely responsive to laterally applied pressure. As clearly indicated in Fig. 8, the plates C are suitably notched or recessed on their upper and lower thickened edges as indicated at 14—14 to cooperate with the ribs 13 for the purpose mentioned.

The movable plates D are of rectangular form and are alternated with the stationary plates C. The plates D are guided in grooves or guides which are defined by the stationary plates C as clearly indicated in Fig. 3. In normal position of the parts, the plates D extend outwardly from the stationary plates toward the front follower but are left slightly spaced from the latter as shown in Fig. 1. The inner ends of the movable plates D normally terminate at a point intermediate the front and rear ends of the stationary plates C, as shown in Fig. 1. The two series of plates C and D are divided into two groups one on each side of the center line so as to leave a central space to accommodate the wedging or pressure-creating system.

The wedging system, as shown, includes the two side wedge-friction-shoes F—F, each bearing against the corresponding innermost movable friction plate D, the centrally disposed two-faced wedge E, and the anti-friction rollers G. The outer face 15 of the wedge E is in engagement with the front follower 16, and normally projects beyond the outer ends of the movable plates D, The spring follower H is of special form, the details of which are best illustrated in Fig. 9. As shown, said spring follower comprises a main plate or follower section proper 17 extending transversely of the mechanism and against the inner face of which the forward ends of the two springs B are adapted to bear. Extended forwardly or outwardly from the plates 17 are two vertically disposed relatively heavy flanges 18—18 separated sufficiently to straddle the anchor block or bar K. The forward edges of said heavy flanges 18 are flat as indicated at 19—19 to provide shoulders bearing against the inner ends 20—20 of the wedge-shoes F. Extended forwardly from the flanges 18 at the top and bottom and arranged horizontally are integral flanges 120—120 which are adapted to straddle the friction-shoes F, the rollers G and the wedge E so as to hold all of said last named elements in proper position, vertically, as best indicated in Fig. 4.

The anchor bar or block K has the ends thereof seated in suitable recesses 21—21 provided on the inner faces of the top and bottom walls 10 of the casting A in the center line thereof, said anchor bar K being limited in its forward movement relative to the casting A by the intermediate ribs 13. On its front side, the bar K is recessed, as indicated at 22, and is formed with a slotted, overhanging flange 23 behind which the head of the retainer bolt J is engaged so as to anchor the inner end of the bolt. The shank of the bolt is extended through a suitable opening in the wedge E and is anchored to the latter by means of the nut 24 which is seated in a socket provided in the wedge E. In this manner it will be observed that the wedge and other parts of the wedging system are held against accidental removal and also that initial compression may be imposed upon the springs B by tightening down the nut 24.

The plate section 17 of the spring follower H is normally spaced from the inner ends of the stationary friction plates C. In order to provide for the return of the movable plates D to normal position after a compression stroke, the column-pressure-transmitting plates or elements L are used, the latter corresponding in number to the number of movable plates D. Each of said elements L is of lesser thickness than the thickness of the movable plates D so that said elements L are loosely interposed between the stationary plates C and hence do not afford any resistance in the return of the parts to normal during the release action. The length of said elements L is made such as to return the movable plates D to their proper position at the time the spring follower H has reached its normal position. By making the elements L independent of each other and separate from the spring follower, the same may be made very cheaply and, in the event of breakage of any one, the cost of replacement is reduced to a minimum.

The operation is as follows, assuming a buffing action of the drawbar. As the latter is moved inwardly, the wedge system is simultaneously moved inwardly therewith without actuation of the movable plates D until the front follower 16 has traversed the space normally left between it and the outer ends of the plates D. During this preliminary action, it will be noted that the spring follower H will have been forced inwardly, thus relieving the plates D of any resistance from the springs B and simultaneously setting up the desired lateral-pressure on the two groups of intercalated plates. After the follower 16 engages the plates D, the latter and the wedging system together with the spring follower H, move inwardly simultaneously and uniformly, the limit being determined by engagement of the follower 16 with the outer end of the casting A. During release, the initial action is as follows: The springs B immediately expand thus forcing the spring follower H outwardly and the latter in turn forcing the wedge-shoes F and the wedge E outwardly without any movement of the plates D. This initial action continues for a limited distance, thereby immediately reducing the pressure on the plates until finally the spring follower H shifts the pressure-transmitting elements L into engagement with the inner ends of the movable plates D, the latter then being forced outwardly under the continued expansion of the springs B.

I have herein shown and described what I now consider the preferred manner of carrying out the invention, but the same is merely illustrative and, I contemplate all changes and modifications that come within the scope of the claims appended hereto.

I claim:

1. In a friction shock absorbing mechanism, the combination with a follower-acting-member; of a plurality of relatively stationary friction plates anchored to said member against movement longitudinally thereof but responsive to laterally applied pressure; a plurality of relatively movable friction plates intercalated with said stationary plates; the inner ends of said movable plates terminating intermediate the ends of the stationary plates; lateral-pressure-creating means cooperable with said intercalated plates; a spring resistance; a spring follower interposed between said resistance and the inner ends of the intercalated plates; and a plurality of independent column-pressure-transmitting elements interposed between the inner ends of said movable plates and said spring follower.

2. In a friction shock absorbing mechanism, the combination with a follower-acting member; of a plurality of relatively stationary friction plates anchored to said member against movement longitudinally thereof but responsive to laterally applied pressure; a plurality of relatively movable friction plates intercalated with said stationary plates, said intercalated plates being divided into two laterally separated groups and the inner ends of the movable plates terminating intermediate the ends of the stationary plates; lateral-pressure-creating means disposed between said two groups of plates and cooperable therewith; a spring resistance; a spring follower interposed between said resistance and the inner ends of the intercalated plates; and a plurality of separate column-pressure-transmitting elements, one for each of the movable friction plates, interposed between the inner ends of said movable plates and the spring follower, said elements being loosely interposed between the stationary friction plates.

3. In a friction shock absorbing mechanism, the combination with a follower-acting member; of a plurality of relatively stationary friction plates anchored to said member against movement longitudinally thereof but responsive to laterally applied pressure; a plurality of relatively movable friction plates intercalated with said stationary plates, said intercalated plates being divided into two laterally separated groups and the inner ends of the movable plates terminating intermediate the ends of the stationary plates; lateral-pressure-creating means disposed between said two groups of plates and cooperable therewith; a spring resistance; a spring follower interposed between said resistance and the inner ends of the intercalated plates, said spring follower having a pair of vertically disposed flanges extended outwardly therefrom and a pair of horizontally disposed flanges extended outwardly from said vertical flanges, said horizontally disposed flanges straddling the lateral-pressure-creating means; a vertically extending centrally disposed anchoring bar mounted within said follower-acting member and extending between said vertically disposed flanges of the spring follower; retaining means operatively associated with said anchoring bar and said pressure-creating means; and a plurality of independent pressure-transmitting elements loosely mounted between the stationary friction plates and interposed between said spring follower and the inner ends of the movable friction plates.

In witness that I claim the foregoing I have hereunto subscribed my name this 11th day of Oct., 1921.

JOHN F. O'CONNOR.

Witnesses:
 CARRIE GAILING,
 ANN BAKER.